3,198,773
LARGE SIZE VINYL CHLORIDE POLYMER
PARTICLES FROM EMULSION LATEX
Alfred Stoloff, Livingston, N.J., assignor to Allied Chemical Corporation, New York, N.Y., a corporation of New York
No Drawing. Filed Sept. 13, 1962, Ser. No. 223,542
2 Claims. (Cl. 260—78.5)

This invention relates to polymers and copolymers of vinyl chloride and more particularly refers to a new and improved method of producing large size polymer particles from polymers produced by the emulsion polymerization process.

Polymers and copolymers of vinyl chloride are commonly produced by two distinct techniques namely (1) suspension polymerization and (2) emulsion polymerization. In the suspension polymerization procedure, liquid vinyl chloride monomer is dispersed in water containing a catalyst under pressure in the presence of a suspending agent and maintained under controlled conditions to form a suspension of the polymeric material in the aqueous phase. The polymeric material may thereafter be separated by filtering or centrifuge and the resultant product is generally composed of large size polymer particles. Such large size polymer particles are particularly advantageous in the production of extruded products such as hoses, tubing, etc. in that large polymer particles may be simply and conveniently dry-blended with plasticizer, which dry blend may be directly introduced to an extrusion apparatus.

In the emulsion polymerization procedure vinyl chloride monomer is dispersed in water containing a small amount of an emulsifying agent and a water soluble catalyst such as an alkali metal persulfate under controlled conditions to form a colloidal emulsion of the desired polymeric material similar in appearance to rubber latex and frequently termed in the art emulsion latex. The polymeric material is commonly isolated as a solid by removal of the aqueous phase in a spray drier. The polymer particles resulting from emulsion polymerization are quite small in size, generally about 0.1 to 2 microns in diameter and are satisfactory for production of vinyl chloride plastisols useful in the preparation of dipped goods, films and coatings. Unfortunately however, it is difficult to produce a dry blend of emulsion polymerized polymer and plasticizer for use in producing extruded products since the small particle size resulting from the emulsion polymerization does not fully absorb the plasticizer as readily as a larger particle size with high bulk density. Thus, the addition of plasticizer to the small size particles i.e. 0.1 to 2 microns in diameter produces a paste or fluid mass which must be handled by a Banbury mixer, then milled, diced or ground and thereafter extruded making the operation costly and time consuming. The emulsion polymerization procedure is superior in many respects to suspension polymerization in that it results in faster production rates and increased capacities than can be obtained with suspension polymerization and moreover emulsion polymerization is less complicated. In short, a major disadvantage of emulsion polymerization is its inability to produce large size polymer particles for dry blending with plasticizer to produce an extrudable mix.

An object of the present invention is to provide a process for producing large size polymer particles of vinyl polymer and copolymer from the emulsion polymerization procedure such that upon addition of conventional plasticizer there is produced a dry blend of polymer and plasticizer eminently suitable for extrusion. Other objects and advantages will be apparent from the following description.

In an effort to obtain large size polymer particles of vinyl chloride polymer or copolymer from emulsion latex, spray drying was attempted under varying conditions but the resultant polymer product was invariably of a small size generally about 4 to 6 microns in diameter. Attempts to substantially increase the spray dried particles as for example by admixing water with the particles and subjecting the mixture to a second spray drying resulted in an unsatisfactory product in that the individual particles did not increase in size but formed lumps or clumps which were even less desirable than the original free flowing small particles produced by spray drying.

In accordance with the present invention it was found that large size particles of polyvinyl chloride polymer or copolymer could be produced by spray drying emulsion latex to produce small size particles, and thereafter admixing and dispersing the small size particles with an additional batch of emulsion latex and spray drying the dispersion of small size particles in emulsion latex to produce large size polymer particles which are 10 to 50 or more times larger than the small size particles dispersed in the latex. Of particular significance, lumping or clumping of the particles did not occur but the particles from the second spray drying retained their particulate identity and were a dry free flowing mass. These large size polymers and copolymers of vinyl chloride produced in accordance with the present invention are easily and conveniently blended with conventionally used plasticizers to produce a dry blend which may be directly added to the extrusion apparatus. In this manner emulsion polymerization with its advantages of faster production rates and increased capacities is utilized in producing large particle size polymers.

Emulsion polymerization to produce an emulsion latex is a well known procedure and involves dispersing vinyl chloride monomer or vinyl chloride monomer with an ethylenically unsaturated polymerizable monomer such as vinyl acetate, vinyl propionate, diethyl maleate, vinylidene chloride and the like, generally in an amount of up to about 15% by weight of the vinyl chloride monomer in the water in the presence of a peroxygen catalyst such as hydrogen peroxide or persalts e.g. alkali persulfates, alkali perborates or alkali percarbonates. Conversion of the vinyl chloride polymer or copolymer is usually effected at temperatures from about 40° to 70° C. The emulsion polymerization process results in a colloidal emulsion of vinyl chloride polymer or copolymer constituting about 30–55%, more generally about 30–40% by weight solids.

A convenient method for separating the polymer in the aqueous emulsion is by spray drying. The apparatus employed for drying may be of any suitable construction and generally involves a drying chamber, a source of hot gas, a means of atomizing the feed and means of separating the dried product from the exhaust gases. Suitable type spray driers are described in Perry's Chemical Engineers Handbook, 3rd ed., pp. 838–846, published by McGraw-Hill, New York (1950). A Bowen spray drier as illustrated on page 844 of Perry's Chemical Engineers Handbook is particularly adapted for use in the present invention. Generally the temperature of the slurry prior to introduction into the drier is about room temperature that is about 65–80° F. and the feed to the atomizer is by gravity. However, other means for introduction of the feed material may be utilized as is known in the art. For example, the slurry may be fed to the atomizer by any suitable pumping apparatus, whereby atomization of the slurry is effected in a swirling blast of hot inert gas flowing through the spray drier. An inlet gas temperature in the range of about 200–350° F. produced satisfactory results with optimum results being obtained when the inlet temperature was in the range of 270–320° F. Outlet temperatures i.e. the temperature of the gas leaving the spray chamber is normally considerably lower than gas inlet temperature and depends to some extent upon the rate of feed to the spray drier. In general an outlet temperature of about 150–210° F. produces a satisfactory product. As inert gases for drying the liquid emulsion there may be employed, air, nitrogen, and mixtures of these and similar fluids.

In the practice of the present operation for production of large size polymer products, an emulsion latex is prepared by dispersing vinyl chloride monomer in water containing emulsifying agent and an alkali metal persulfate catalyst and the mixture heated at a temperature of 130° F. as is conventional. The resultant emulsion latex having a solid content of about 35% is then subjected to spray drying by contact with hot inert gas entering at a temperature of 300° F. and discharging at a temperature of 180° F. The dried polymer product is a free flowing powder composed of particles of about 1.0 to 4 microns in diameter. This small size particle polymer product is added to another portion of emulsion latex prepared as above and the mixture agitated sufficiently to effect a dispersion of the small size polymer particles throughout the emulsion latex. The quantity of small size polymer product added is based upon the solids content of the emulsion latex. The ratio of added small size polymer to the solids content of the latex before mixing should be at least 0.25:1 and may be as high as 1.5:1. Preferably the ratio of added solids to original latex solids should be within the range of 0.75:1–1.25:1. Ratios of 0.25:1 or more are necessary to convert the entire charge or substantially all of it into particles of desired larger size whereas the use of ratios above 1.5:1 tends to cause formation of clumps. The mixture of small size solid particles of polymer in the emulsion latex is then subjected to spray drying in a manner as previously described producing large size polymer particles which are generally 10 to 40 times larger in diameter than the small size particles dispersed in the emulsion latex and translated in terms of micron size range from about 10 microns to as high as 200 microns. These large size particles are characterized by an increase in the diameter of the individual particles as contrasted to forming lumps or clumps or stated another way the individual particles do not lose their particulate identity and are free flowing mass.

The large size polyvinyl particles may be blended with conventional plasticizers and this dry blend fed directly into an extruder without the necessity of intermediate processing. Examples of conventional plasticizers are esters of polyglycols, polyesters of adipic, azelaic, or sebacic acid with glycols terminated with long chain fatty acids, esters of polyglycols etc. The amount of plasticizer employed depends on the desired properties of the final product and may vary from about 10 to 50% of the polymer product.

The following examples illustrate the present invention.

Example I

An emulsion latex is prepared by dispersing vinyl chloride monomer in water containing sodium stearate emulsifying agent and sodium persulfate and the mixture heated at 125° F. to produce an emulsion having a total solids content of 32%. The emulsion was then gravity fed at a rate of 5.5 lbs. per minute at room temperature to an atomizer member of a Bowen engineering spray drier of a design similar to that illustrated on page 844, FIG. 44 of Perry's Chemical Engineers Handbook, 3rd ed., pp. 838,846, published by McGraw-Hill, New York (1950). A 7 inch atomizer was utilized with an atomizing force speed of 21,000 r.p.m. Air was employed for the drying and the feed was dried from a 340° F. inlet temperature, the feed rate being adjusted to yield a 160° F. outlet temperature. After 286 min. of operation a total of 3 lbs. of product was collected out of the chamber by brushing the walls clean while 432 lbs. was collected on stream from the powder cooling cyclone. Upon analysis, the product showed no trace of moisture but there was slight agglomeration due to fine particle size which averaged about 3 microns (microscopic analysis). These cyclone solids were reconstituted with previously prepared 32% vinyl chloride solids content emulsion to form a slurry of vinyl chloride containing about a 55% solids content. The slurry was gravity fed at a rate of 5 lbs. per minute at room temperature to the spray drier wherein the feed was dried from a 320° F. inlet temperature with the feed rate being adjusted to yield a 200° F. outlet temperature. A 6 inch atomizer was utilized with an atomizing force speed of 14,000 r.p.m. Direct gas was employed for the drying. The spray drier was rearranged to collect part of the product on the base of the chamber. 24 lbs. of product was collected at the powder cooling collector, 29 lbs. at the chamber collector and 4 lbs. from the chamber walls. An analysis of the product indicated that the particles contained many spheres which were free flowing and which upon microscopic examination showed a size range of 20–170 microns which averaged about 80 microns. A portion of this product was admixed with conventional plasticizer and produced a dry blend suitable for molding or extrusion purposes.

Example II

The emulsion polymerization of vinyl chloride-vinyl acetate copolymer was effected in the usual fashion to produce a total solids content of 32%. Using the apparatus in Example I the emulsion was then fed at a rate of 80–114 ml./min. at room temperature to the atomizing member of the spray drier. The feed was dried form a 200–225° F. inlet temperature and the feed rate adjusted to yield a 155–140° F. outlet temperature. Atomizer air pressure of 100 p.s.i.g. was utilized. Direct gas was employed for the drying. A total of 530 lbs. was collected which upon microscopic analysis showed a particle size averaging about 3 microns. A slight agglomeration due to the fine particle size was noticed. This product was reconstituted with fresh 32% solids content of copolymer to produce a total solids content of 59.5%. The slurry was then fed at room temperature at a rate of 165–180 ml./min. wherein the feed was dried from a 250° F. inlet temperature with the feed rate being adjusted to yield a 180–178° F. outlet temperature. A total of 360 lbs. was collected from the spray drier which upon microscopic analysis showed an average particle size of 50–60 microns. The product was a white free flowing powder.

Although certain preferred embodiments of the present invention have been disclosed for purpose of illustration, it will be evident that various changes and modifications may be made therein without departing from the scope and spirit of the invention.

I claim:

1. A process for the production of large size polymer particles selected from the group consisting of polymers of vinyl chloride and copolymers of vinyl chloride with other ethylenically unsaturated compounds selected from the group consisting of vinyl acetate, vinyl propionate, diethyl maleate and vinylidene chloride from emulsion latex containing said polymers which comprises spray drying the emulsion latex to remove the aqueous phase of the emulsion latex and produce small size particles of polymer, thereafter admixing and dispersing said small size particles of polymer with additional emulsion latex to give a ratio of added solids to original latex solids of 0.25:1–1.5:1 by weight, spray drying said mixture of small particles of polymer dispersed in the emulsion latex to remove the aqueous phase of the mixture and produce large size particles of polymer.

2. A process for the production of large size polymer particles selected from the group consisting of polymers of vinyl chloride and copolymers of vinyl chloride with other ethylenically unsaturated compounds selected from the group consisting of vinyl acetate, vinyl propionate, diethyl maleate and vinylidene chloride from emulsion latex containing said polymers which comprises spray drying the emulsion latex to remove the aqueous phase of the emulsion latex and produce small size particles of polymer, thereafter admixing and dispersing said small size particles of polymer with additional emulsion latex to give a ratio of added solids to original latex solids of 0.75:1–1.25:1 by weight, spray drying said mixture of small particles of polymer dispersed in the emulsion latex to remove the aqueous phase of the mixture and produce large size particles of polymer.

References Cited by the Examiner

UNITED STATES PATENTS

| | | | |
|---|---|---|---|
| 2,187,877 | 1/40 | Ferris et al. | 260—92.8 |
| 2,674,593 | 4/54 | Condo et al. | 260—92.8 |

JOSEPH L. SCHOFER, *Primary Examiner.*

WILLIAM H. SHORT, *Examiner.*